(12) United States Patent
Liang et al.

(10) Patent No.: US 7,754,341 B2
(45) Date of Patent: Jul. 13, 2010

(54) FILMS WITH SUPERIOR IMPACT RESISTANCE AND IMPROVED CATASTROPHIC FAILURE RESISTANCE UNDER HIGH STRAIN RATE

(75) Inventors: Wenbin Liang, Sugar Land, TX (US); David B. Ramsey, Angleton, TX (US); Staci A. DeKunder, Pearland, TX (US); Kalyan Sehanobish, Rochester Hills, MI (US); Jesus Nieto, Cambrils (ES); John L. Presa, Brazoria, TX (US); Shaun E. Pirtle, Brazoria, TX (US)

(73) Assignee: Dow Global Technologies Inc., Midland, MI (US)

( * ) Notice: Subject to any disclaimer, the term of this patent is extended or adjusted under 35 U.S.C. 154(b) by 93 days.

(21) Appl. No.: 10/579,429

(22) PCT Filed: Nov. 29, 2004

(86) PCT No.: PCT/US2004/039823
§ 371 (c)(1),
(2), (4) Date: May 15, 2006

(87) PCT Pub. No.: WO2005/065945
PCT Pub. Date: Jul. 21, 2005

(65) Prior Publication Data
US 2007/0082191 A1    Apr. 12, 2007

(51) Int. Cl.
*B32B 27/32* (2006.01)
*B32B 27/08* (2006.01)

(52) U.S. Cl. .................. 428/515; 428/220; 428/332; 428/335; 428/336

(58) Field of Classification Search .................. None
See application file for complete search history.

(56) References Cited

U.S. PATENT DOCUMENTS

| | | |
|---|---|---|
| 3,456,044 A | 7/1969 | Pehlke |
| 4,076,698 A | 2/1978 | Anderson et al. |
| 4,352,849 A | 10/1982 | Mueller |
| 4,820,557 A | 4/1989 | Warren |
| 4,837,084 A | 6/1989 | Warren |
| 4,865,902 A | 9/1989 | Golike et al. |
| 4,927,708 A | 5/1990 | Herran et al. |
| 4,952,451 A | 8/1990 | Mueller |
| 4,963,419 A | 10/1990 | Lustig et al. |
| 5,059,481 A | 10/1991 | Lustig et al. |
| 5,248,547 A | 9/1993 | Wilson |
| 5,272,236 A | 12/1993 | Lai et al. |
| 5,278,272 A | 1/1994 | Lai et al. |
| 5,752,362 A | 5/1998 | Eichbauer |
| 5,756,219 A | 5/1998 | Miro et al. |
| 5,844,045 A | 12/1998 | Kolthammer et al. |
| 5,869,575 A | 2/1999 | Kolthammer et al. |
| 5,902,684 A | 5/1999 | Bullard et al. |
| 5,907,943 A * | 6/1999 | Eichbauer ..................... 53/441 |
| 5,922,441 A | 7/1999 | Eichbauer |
| 5,998,017 A | 12/1999 | Eichbauer |
| 6,093,480 A | 7/2000 | Eichbauer |
| 6,111,023 A | 8/2000 | Chum et al. |
| 6,132,827 A | 10/2000 | Miro |
| 6,265,055 B1 | 7/2001 | Simpson et al. |
| 6,428,901 B1 | 8/2002 | Agarwal et al. |
| 6,448,341 B1 | 9/2002 | Kolthammer et al. |
| 6,492,010 B1 | 12/2002 | Karaoglu et al. |
| H2073 H | 7/2003 | Culotta |
| 6,740,609 B1 | 5/2004 | Peng et al. |
| 2003/0114595 A1 | 6/2003 | Van Dun et al. |
| 2003/0139546 A1 | 7/2003 | Jain et al. |
| 2003/0215659 A1 | 11/2003 | Farley et al. |

FOREIGN PATENT DOCUMENTS

| | | |
|---|---|---|
| EP | 0 785 065 A | 7/1997 |
| EP | 0 877 051 A | 11/1998 |
| JP | 2000-141550 | 5/2000 |
| WO | WO-98/26000 A | 6/1998 |
| WO | WO-01/98372 A | 12/2001 |

OTHER PUBLICATIONS

Anonymous, "Advantages of Metallocene Ethylene Polymer Resins in Blown and Cast Stretch Films," Research Disclosure, Kenneth Mason Publications, Hampshire, GB, vol. 376, No. 32, Aug. 1995.

Anonymous, "Advantages of Metallocene Ethylene Polymer Resin Blends in Blown and Cast Films," Research Disclosure, Kenneth Mason Publications, Hampshire, GB, vo. 376, No. 52, Aug. 1995.

(Continued)

*Primary Examiner*—Sheeba Ahmed

(57) ABSTRACT

Stretch films which exhibit good puncture and impact resistance while also exhibiting resistance to defect propagation are desired. The films of the present invention have an ultimate stretch of at least 200 percent, a dart impact strength of at least about 700 gms/mil and a catastrophic failure stretch of at least 95 percent of the elongation to break value (CF of 5 or less). The films preferably comprise at least 3 layers and preferably comprise at least 50 percent by weight of polyethylene polymers.

18 Claims, 1 Drawing Sheet

OTHER PUBLICATIONS

Anonymous, "Advantages of Metallocene Ethylene Polymer Resins in Multilayer Blown and Cast Stretch Films," Research Disclosure, Kenneth Mason Publications, Hampshire, GB, vol. 412, No. 52, Aug. 1998.

Kirk-Othmer, The Encyclopedia of Chemical Technology, $3^{rd}$ ed., 416-417 (1981) vol. 16, John Wiley & Sons, New York.

Kirk-Othmer, The Encyclopedia of Chemical Technology, $3^{rd}$ ed., 191-192 (1982) vol. 18, John Wiley & Sons, New York.

* cited by examiner

FILMS WITH SUPERIOR IMPACT RESISTANCE AND IMPROVED CATASTROPHIC FAILURE RESISTANCE UNDER HIGH STRAIN RATE

CROSS-REFERENCE TO RELATED APPLICATIONS

Not Applicable

STATEMENT REGARDING FEDERALLY SPONSORED RESEARCH OR DEVELOPMENT

Not Applicable

The Names of the Parties to a Joint Research Agreement
Not Applicable

INCORPORATION-BY-REFERENCE OF MATERIAL SUBMITTED ON A COMPACT DISC

Not Applicable

BACKGROUND OF THE INVENTION

The use of thermoplastic stretch wrap films for the over-wrap packaging of goods, and in particular, the unitizing of palleted loads is a commercially significant application of polymer film, including generically, polyethylene. Over-wrapping a plurality of articles to provide a unitized load can be achieved by a variety of techniques. In one procedure, the load to be wrapped is positioned upon a platform, or turntable, which is made to rotate and in so doing, to take up stretch wrap film supplied from a continuous roll. Braking tension is applied to the film roll so that the film is continuously sub-jected to a stretching, or tensioning, force as it wraps around the rotating load in overlapping layers. Generally, the stretch wrap film is supplied from a vertically arranged roll positioned adjacent to the rotating pallet load. Rotational speeds of from 5 to 50 revolutions per minute are common. At the completion of the overwrap operation, the turntable is completely stopped and the film is cut and attached to an underlying layer of film employing tack sealing, adhesive tape, spray adhesives, etc. Depending upon the width of the stretch wrap roll, the load being overwrapped can be shrouded in the film while the vertically arranged film roll remains in a fixed position. Alternatively, the film roll, for example, in the case of relatively narrow film widths and relatively wide pallet loads, can be made to move in a vertical direction as the load is being overwrapped whereby a spiral wrapping effect is achieved on the packaged goods.

Another wrapping method finding acceptance in industry today is that of hand wrapping. In this method, the film is again arranged on a roll, however, it is hand held by the operator who walks around the goods to be wrapped, applying the film to the goods. The roll of film so used may be installed on a hand-held wrapping tool for ease of use by the operator.

Historically, higher performance stretch films have been prepared with linear low density polyethylene made using a metallocene catalyst (m-LLDPE), most often with the m-LLDPE located in an interior layer. Such films have shown markedly improved puncture and impact resistance as well as improved film clarity relative to counterparts made with more traditional LLDPEs made using Ziegler-Natta catalysts. Stretch films employing higher amounts (up to 100 wt percent) of m-LLDPE either as a discrete layer or layers, or as a blend component in a discrete layer or layers of a multilayer stretch film, propagate defects more easily leading to web breakage. This defect propagation, also referred to as catastrophic film failure, has precluded the development of film structures containing higher concentrations of m-LLDPE to maximize toughness.

BRIEF SUMMARY OF THE INVENTION

Accordingly, stretch films which exhibit good puncture and impact resistance while also exhibiting resistance to defect propagation are desired. The films of the present invention have an ultimate stretch of at least about 200 percent, a dart impact strength of at least about 700 gms/mil and a catastrophic failure stretch of at least about 95 percent of the ultimate stretch value (CF of about 5 percent or less). The films preferably comprise at least 3 layers and preferably comprise at least 50 percent by weight of polyethylene polymers.

DETAILED DESCRIPTION OF THE INVENTION

Figure 1:
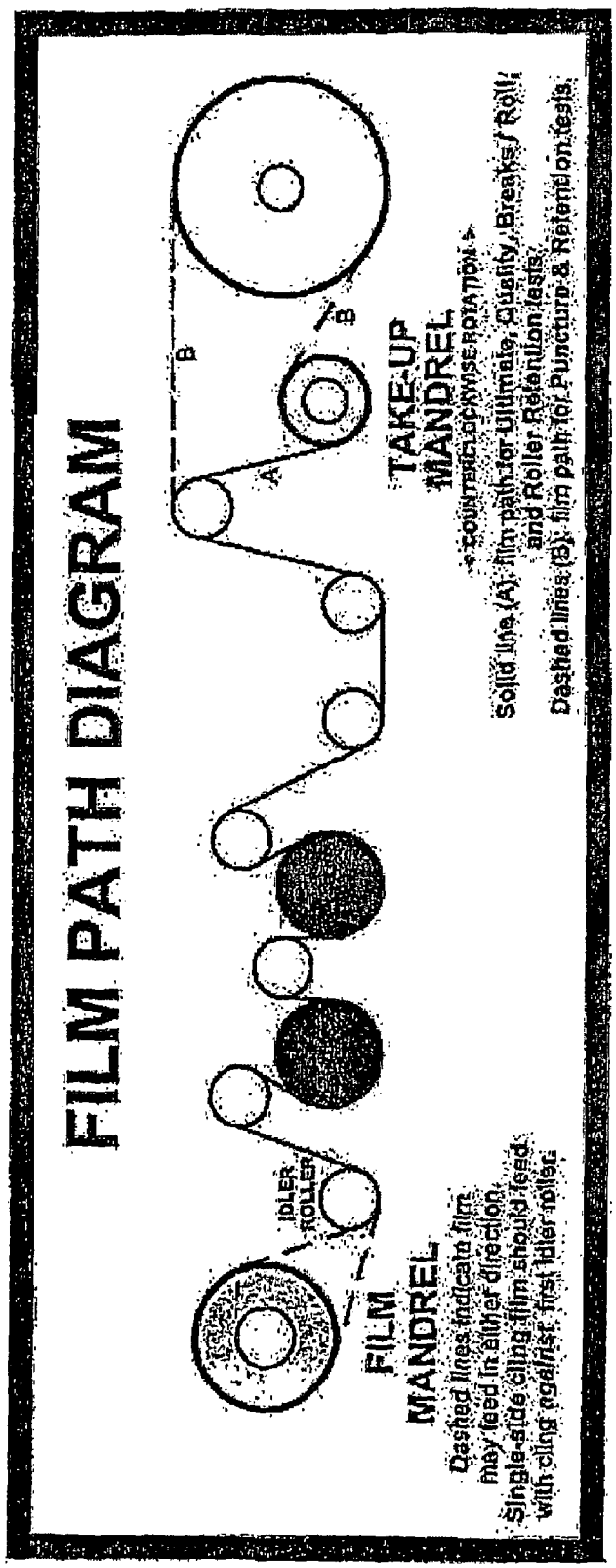
FIG. 1 is a diagram showing a suitable film path for a testing device for determining parameters such as ultimate stretch and catastrophic failure of films.

The films of the present invention are stretch films. Accordingly, they will have an ultimate stretch of at least about 200 percent. Preferably the films will have an ultimate stretch of at least 250 percent, more preferably at least 300 percent, and can be as high as about 370 percent. Preferably, the stretch film comprises a homogeneous polymer component. More preferably, the stretch film is made at a commercial output rate, for example at a rate of at least about 6 pounds/hour/inch of die width.

The ultimate stretch (or "US") is determined by the Highlight Test Stand commercially available from Highlight Industries, 2694 Prairie Street SW, Wyoming, Mich. 49509, in which the film starts at 0 percent stretch and is elongated until the film fails (known as the ultimate stretch percent) and is displayed and graphed by the test stand. It should be understood that the ultimate stretch will be dependent upon the thickness of the film, and the stated preferences above correspond to a film having a thickness of about 0.7 mil. FIG. 1 shows the film path diagram for such a testing device. In this FIGURE, the dotted lines at the film mandrel indicate that the film may feed in either direction (single-side cling film should feed such that the cling side in against the first idler roller). The solid line (A) at the take up mandrel (which rotates counterclockwise in the FIGURE), indicates the preferred path for Ultimate, Quality, Breaks/Roll and Roller Retention tests, whereas the dotted line (B) represents the preferred path for Puncture & Retention tests.

The films of the present invention may be up to 3 mils (0.0762 mm) thick, preferably in the range of 0.4 mil (0.0102 mm) to 1.0 mil (0.0254 mm) thick and even more preferred about 0.7 mil (0.0178 mm) thick.

The films of the present invention can be monolayer but are more preferably three or more layers. If the film is a multi-layer structure, the layers may be of any desired thickness, and any desired polymeric composition. It should be understood that two or more of the layers, including adjacent layers, may be identical.

The films of the present invention will have relatively high dart impact strength. Dart impact strength can be determined using ASTM D1709. The films of the present invention will have a dart impact strength of at least 300 grams as measured by ASTM D1709 (Dart A) for a 0.7 mil film. More preferably the films will have a Dart A value of 400 grams or greater, and most preferably 500 grams or greater for a 0.7 mil film. While it is not believed that the relationship between dart impact strength and film thickness is linear, for thicknesses other than 0.7 mil, it is generally preferred that dart impact strength be greater than about 430 gram/mil, more preferably greater than about 570 gram/mil and most preferably greater than about 700 gram/mil.

The films of the present invention will also be resistant to catastrophic failure. Catastrophic failure can be measured using a Highlight Ultimate Stretch Tester Puncture Test, using equipment manufactured by Highlight Industries, Inc. and conducted in accord with Highlight Stretch Tester product literature and operating manuals. In this procedure, which is also referred to in the Statutory Invention Registration US H2073H as Defect Propagation Resistance Testing, the films are stretched increasing amounts to determine the ultimate stretch percentage. At some increased percentage stretch, a defect is introduced by way of the Highlight Stretch Tester Puncture Test. As the percentage stretch is increased, at some point the film will experience a catastrophic failure initiating at the puncture point, destroying the continuity of the film. The percentage stretch at which catastrophic failure is observed is referred to herein as "CS". As above, FIG. 1 shows the film path diagram for such a device.

The resistance to catastrophic failure can be characterized using the ratio of the ultimate stretch percentage minus the catastrophic failure stretch percentage divided by the ultimate stretch percentage. This ratio, hereinafter referred to as "CF" is expressed as a percentage and is defined herein to mean: 100*(US-CS)/US. Thus, for example, if the ultimate stretch for a film was 300 percent and the stretch where catastrophic failure was observed in the Highlight Stretch Puncture test was 270 percent, the CF would be 10 percent.

The films of the present invention have a CF of 5 percent or less, more preferably a CF of 4 percent or less and moist preferably a CF of 3 percent or less.

In another aspect, the invention is a stretch film having an ultimate stretch of at least 200 percent, a Dart A of at least 430 gms/mil and a CF of 5 percent or less, and comprising at least three layers, wherein a non-skin layer comprises a propylene polymer, and at least one other layer comprises an ethylene polymer composition, wherein the composition comprises:

(A) from 10 percent (by weight of the total composition) to 95 percent (by weight of the total composition) of at least one ethylene interpolymer having:
(i) a density from 0.89 g/cm³ to 0.935 g/cm³,
(ii) a melt index ($I_2$) from 0.001 g/10 minutes to 10 g/10 minutes,
(iii) a slope of strain hardening coefficient greater than or equal to 1.3, and
(iv) a Composition Distribution Index (CDBI) greater than 50 percent; and (B) from 5 percent (by weight of the total composition) to 90 percent (by weight of the total composition) of at least one ethylene polymer having a density from 0.93 g/cm³ to 0.965 g/cm³ and a linear polymer fraction, as determined using temperature rising elution fractionation (TREF).

In yet another aspect, the invention is a stretch film having an ultimate stretch of at least 200 percent, a Dart A of at least 430 gms/mil and a CF of 5 percent or less, and comprising at least three layers, wherein a non-skin layer comprises a propylene polymer, and at least one other layer comprises an ethylene polymer composition, wherein the composition comprises:

(A) from 10 percent (by weight of the total composition) to 100 percent (by weight of the total composition) of at least one ethylene interpolymer having:
(i) a density from 0.89 g/cm³ to 0.935 g/cm³,
(ii) a melt index ($I_2$) from 0.001 g/10 minutes to 10 g/10 minutes, preferably from 0.001 g/10 minutes to 1 g/10 minutes, more preferably from 0.001 g/10 minutes to 0.5 g/10 minutes,
(iii) a molecular weight distribution, Mw/Mn, from 2 to 4, and
(iv) a Composition Distribution Index (CDBI) greater than 50 percent; and (B) optionally, from 5 percent or less (by weight of the total composition) to 90 percent (by weight of the total composition) of at least one ethylene polymer having a density from 0.93 g/cm³ to 0.965 g/cm³ and a linear polymer fraction, as determined using temperature rising elution fractionation (TREF).

In still another aspect, the invention is a stretch film having an ultimate stretch of at least 200 percent, a Dart A of at least 430 gms/mil and a CF of 5 percent or less, and comprising at least three layers, wherein a non-skin layer comprises a propylene polymer, and at least one other layer comprises an ethylene polymer composition, wherein the composition comprises:

(A) an ethylene interpolymer having a molecular weight distribution, $M_w/M_n$, of less than about 3, and a narrow composition distribution breadth index (CDBI), defined as the weight percent of the polymer molecules having a comonomer content within 50 percent of the median total molar comonomer content, which is greater than about 50 percent and a degree of branching less than or equal to 2 methyls/1000 carbons of about 15 percent (by weight) or less, said interpolymer A being present in an amount of from 15 to 85 percent by weight based on the combined weight of Components A and B; and (B) an interpolymer having a molecular weight distribution, $M_w/M_n$, of 3 or more and a broad composition distribution and a degree of branching less than or equal to 2 methyls/1000 carbons of about 10 percent (by weight) or more and a degree of branching greater than or equal to 25 methyls/1000 carbons of from about 25 percent (by weight) or less present in the interpolymer composition, said interpolymer B being present in an amount of from 15 to 85 percent by weight based on the combined weight of Components A and B.

Preferably, the ethylene compositions described in the last three embodiments comprise a skin layer.

The films can be made from any polymer capable of achieving the stretch films having the indicated impact resistance and resistance to catastrophic failure. It is generally preferred that the film be comprised of polyethylene homopolymers or copolymers, and preferably such polymers make up at least about 50 percent by weight of the film. Polyethylene homopolymers include all types of homopolymers, including gas phase, slurry and solution produced homopolymers. Polyethylene copolymers include ethylene/$C_3$-$C_{20}$ alpha-olefins, especially ethylene/1-hexene copolymers, ethylene/4-methyl-1-pentene copolymers, and ethylene/1-octene copolymers. Types of polyethylene, both copolymers and homopolymers, can advantageously be selected for the desired combination of other properties, such as clarity and cling. These types of polyethylene include metallocene polyethylene, such as that described in U.S. Pat.

No. 5,278,272 and U.S. Pat. No. 5,272,236, as well as Ziegler-Nata polyethylene, such as that described in U.S. Pat. No. 4,076,698, the disclosures of all of which are incorporated herein by reference. Of course, one skilled in the art of film manufacture knows that the molecular weight is chosen for optimum film performance, as well as physical properties desired. Similarly, polymer density is also selected for performance, including desired film stiffness. Various film manufacturing techniques can be used, such as blown, cast and extrusion coated, although cast film is preferred. In-situ reactor "blends" are also useful in the film structures of the invention. The polymer materials can be described as in U.S. Pat. No. 5,844,045 and U.S. Pat. No. 6,111,023, the disclosures of which are incorporated herein by reference.

Such film structures may be made by conventional fabrication techniques, for example simple bubble extrusion, biaxial orientation processes (such as tenter frames or double bubble processes), simple cast/sheet extrusion, coextrusion, lamination, etc. Conventional simple bubble extrusion processes (also known as hot blown film processes) are described, for example, in The Encyclopedia of Chemical Technology, Kirk-Othmer, Third Edition, John Wiley & Sons, New York, 1981, Vol. 16, pp. 416-417 and Vol. 18, pp. 191-192, the disclosures of which are incorporated herein by reference. Biaxial orientation film manufacturing processes such as described in the "double bubble" process of U.S. Pat. No. 3,456,044 (Pahlke), and the processes described in U.S. Pat. No. 4,352,849 (Mueller), U.S. Pat. Nos. 4,820,557 and 4,837,084 (both to Warren), U.S. Pat. No. 4,865,902 (Golike et al.), U.S. Pat. No. 4,927,708 (Herran et al.), U.S. Pat. No. 4,952,451 (Mueller), and U.S. Pat. Nos. 4,963,419 and 5,059,481 (both to Lustig et al.), the disclosures of which are incorporated herein by reference, can also be used to make the novel film structures of this invention.

Polymers other than polyethylenes can also be advantageously used in the present invention. Propylene polymers include polypropylene homopolymer and copolymers, including random and impact copolymers, such as propylene/ethylene copolymers and are particularly well suited for use in the present invention. Propylene polymers having a 2 percent secant modulus, as measured by ASTM D 882, of about 150,000 psi and less are preferred. Propylene polymers include those commercially available from ExxonMobil (VISTAMAXX™) and The Dow Chemical Company (for example, INSPIRE™ and VERSIFY™. In certain applications it may also be desirable to have one or more layers of the film structure comprise a styrenic block copolymer (such as SBS, SEBS, SIS, SIBS etc.), EPDM rubber or EPR, or multi-block copolymers such as thermoplastic elastomers based on polyurethanes, polyethers and polyamides. In the propylene polymers useful in this invention, the polymers comprise at least 50 percent (by weight) propylene monomer units.

Stretch film comprising the compositions disclosed herein are also within the scope of the invention, wherein at least one non-surface layer (also known as a non-skin layer) comprises at least one propylene polymer.

In another aspect, the invention is a stretch film comprising at least one layer comprising an ethylene polymer, wherein the film has a tensile stress at break of at least 5000 psi and an ultimate stretch of at least 200 percent, a Dart A of at least 430 gms/mil and a CF of 5 percent or less. Preferably, the film contains a non-surface layer comprising at least one propylene polymer.

In still another aspect, the invention is a stretch film comprising at least one layer comprising an ethylene polymer, wherein the film has a tensile stress at break of at least 5000 psi and an ultimate stretch of at least 200 percent and a CF of 5 percent or less. Preferably, the film contains a non-surface layer comprising at least one propylene polymer.

In multilayer films it was observed that the choice of compositions used for internal layers appeared to effect the CF values more than the polymer composition for the outside layers. Thus it is preferred that one or more of the core (or non-surface) layers of the film comprise a heterogeneously branched polyethylene characterized as having: a density from 0.9 g/cc to 0.96 g/cc; a melt index from 0.5 g/10 minutes to 10 g/10 minutes, measured in accordance with ASTM D 1238, condition 190C/2.16 kg; and a molecular weight distribution from 2.5 to 4.5.

EXAMPLES

All cast film samples are fabricated on a 5-layer Egan cast film line consisting of three 2.5 in. and two 2.0 in. 30:1 L/D Egan Model MAC 6530 air cooled extruders. A Chloren 5-layer adjustable vane feedblock and 36 in. EPOCH III autogauge 5.1 coat hanger die with a 0.020 in. die gap are utilized during this evaluation. Extruder barrel temperatures are adjusted based on the resin and pumping rates to maintain a constant melt temperature. The die zone temperatures correspond to the polymer melt temperature, approx. 525 degrees F. Line speeds are controlled at 700 fpm by the CMR 2000 microprocessor while film thickness (0.7 mil) is measured utilizing a NDC thickness gauge. Both primary and secondary chill roll temperatures are held at a constant 70 degrees F. Air gap is maintained at approximately 3.5" for all samples. An air knife is used to pin the film to the chill roll.

Ultimate tensile strain percentage and ultimate tensile stress are tested as described in ASTM D882. Ultimate stretch and catastrophic failure percentages are obtained utilizing a Highlight test stand manufactured by Highlight Industries, Inc. Dart A impact resistance is measured as described in ASTM D1709 and is tested on unstretched film.

In the following Examples, Resin A is an ethylene/1-octene copolymer, comprising about 51 percent (by weight) of a metallocene component having a melt index of about 1.85 g/10 minutes and a density of about 0.910 g/cc and about 49 percent of a Ziegler Natta component having a melt index of about 5.04 g/10 minutes and a density of about 0.923 g/cc; the final polymer composition has a melt index of about 4.0 g/10 minutes and a density of about 0.916 g/cc. Such polymers can be made according to U.S. Pat. No. 5,844,045, U.S. Pat. No. 5,869,575, U.S. Pat. No. 6,448,341, the disclosures of which are incorporated herein by reference. Melt index is measured in accordance with ASTM D-1238, condition 190 C/2.16 kg and density is measured in accordance with ASTM D-792.

Resin B is an ethylene polymer having a density of 0.918 g/cc and a melt index (190° C.) of 3.5 g/10 minutes (ASTM D1238), commercially available from the ExxonMobil Company as Exceed™ 3518.

Resin C is homopolymer polypropylene produced via the Unipol process from The Dow Chemical Company, having a density of 0.90 g/cc and a melt flow rate (230° C.) of 8.7 g/10 min. (ASTM D1238).

Resin D is a blend comprising 85 percent by weight of Resin C and 15 percent of an ethylene plastomer produced via INSITE* Technology from Dow, having a density of 0.87 g/cc and a melt index (190° C.) of 5.0 g/10 min. (ASTM D1238). This resin is commercially available from The Dow Chemical Company as AFFINITY™ EG8200.

Resin E is linear low density polyethylene produced by the solution process, having a density of 0.941 g/cc and a melt index (190° C.) of 4.0 g/10 min. (ASTM D1238). This resin is commercially available from The Dow Chemical Company as DOWLEX™ 2027G.

For comparative examples 1 and 3 and Examples 1 and 2, a series of films consisting of Resin A/Resin A/Core layer/Resin A/Resin A with a layer ratio of 10/35/10/35/10 were fabricated. In comparative Example 2, the film consisted of Resin B in all 5 layers. In comparative Example 4, the film consisted of Resin E/Resin A/Resin A/Resin A/Resin A with a layer ratio of 10/35/10/35/10. The performance properties of the films are compared in Table I below.

TABLE I

|  | Comp. 1 | Comp. 2 | Comp. 3 | Example 1 | Example 2 | Comp. 4 |
| --- | --- | --- | --- | --- | --- | --- |
| Core Layer Composition | Resin A | Resin B | Resin C | Resin D | Resin E | Resin A |
| Gauge - (mils) | 0.7 | 0.7 | 0.8 | 0.7 | 0.7 | 0.7 |
| US (percent) | 317 | 311 | 378 | 327 | 342 | 339 |
| CS (percent) | 290 | 255 | 370 | 325 | 341 | 295 |
| CF (percent) | 9 | 18 | 3 | 1 | 0 | 13 |
| Dart A (grams) | 850 | 820 | 208 | 668 | 306 | 178 |

Comparative 1 and Comparative 2 showed undesirably low catastrophic failure strain values (CS) of <305 percent, and undesirably high catastrophic failure values (CF) (>10 percent). Comparative 3 showed undesirably low impact resistance (<300 grams). The Example 1 of this invention showed high catastrophic failure strain (364 percent) and good dart impact strength (668 grams). Example 2 of this invention showed high catastrophic failure strain (341 percent) and acceptable dart impact strength (306 grams).

What is claimed is:

1. A stretch film having three or more layers wherein:
   A) at least one layer comprises a polyethylene characterized as having:
      i) a density from about 0.9 g/cc to about 0.96 g/cc;
      ii) a melt index from about 0.5 g/10 minutes to about 10 g/10 minutes, measured in accordance with ASTM D 1238, condition 190°/2.16 kg; and
      iii) a molecular weight distribution from about 2.5 to about 4.5; and
   B) wherein at least one non-surface layer comprises at least one propylene polymer comprising at least 50% by weight of units derived from propylene; and
   C) wherein the stretch film is characterized as having an ultimate stretch of at least 200%, a Dart A of at least 430 gms/mil and a CF of 5% or less.

2. The stretch film of claim 1 wherein the film comprises at least 50% by weight polyethylene.

3. The stretch film of claim 1 wherein the film is in the range of 0.4 to 3 mil in thickness.

4. The stretch film of claim 3 wherein the film is in the range of 0.7 mils to 3 mils.

5. The stretch film of claim 1 having a Dart A greater than 570 gms/mil.

6. The stretch film of claim 1 having a Dart A greater than 700 gms/mil.

7. The stretch film of claim 1 having a CF of 3% or less.

8. The stretch film of claim 1 having an ultimate stretch of at least 300%.

9. The stretch film of claim 1 comprising a homogeneous polymer component.

10. The stretch film of claim 1 wherein the film is made at an output rate of at least about 6 pounds/hour/inch of die width.

11. The stretch film of claim 1, wherein the film has a tensile stress at break of at least 5000 psi.

12. The stretch film of claim 11 further characterized as having a Dart A of at least 430 gms/mil.

13. A stretch film having an ultimate stretch of at least 200%, a Dart A of at least 430 gms/mil and a CF of 5% or less, and comprising at least three layers, wherein a non-skin layer comprises a propylene polymer comprising at least 50% by weight of units derived from propylene, and at least one other layer comprises an ethylene polymer composition, wherein the ethylene polymer composition comprises:
   (A) from about 10 percent (by weight of the total composition) to about 95 percent (by weight of the total composition) of at least one ethylene interpolymer having:
      (i) a density from about 0.89 g/cm$^3$ to about 0.935 g/cm$^3$,
      (ii) a melt index (I$_2$) from about 0.001 g/10 minutes to about 10 g/10 minutes,
      (iii) a slope of strain hardening coefficient greater than or equal to 1.3, and
      (iv) a Composition Distribution Index (CDBI) greater than 50 percent; and
   (B) from about 5 percent (by weight of the total composition) to about 90 percent (by weight of the total composition) of at least one ethylene polymer having a density from about 0.93 g/cm$^3$ to about 0.965 g/cm$^3$ and a linear polymer fraction, as determined using temperature rising elution fractionation (TREF).

14. A stretch film having an ultimate stretch of at least 200%, a Dart A of at least 430 gms/mil and a CF of 5% or less, and comprising at least three layers, wherein a non-skin layer comprises a propylene polymer comprising at least 50% by weight of units derived from propylene, and at least one other layer comprises an ethylene polymer composition, wherein the ethylene polymer composition comprises:
   (A) from about 10 percent (by weight of the total composition) to about 100 percent (by weight of the total composition) of at least one ethylene interpolymer having:
      (i) a density from about 0.89 g/cm$^3$ to about 0.935 g/cm$^3$,
      (ii) a melt index (I$_2$) from about 0.001 g/10 minutes to about 10 g/10 minutes,
      (iii) a molecular weight distribution, Mw/Mn, from about 2 to about 4, and
      (iv) a Composition Distribution Index (CDBI) greater than 50 percent; and
   (B) optionally, from about 5 percent or less (by weight of the total composition) to about 90 percent (by weight of the total composition) of at least one ethylene polymer having a density from about 0.93 g/cm$^3$ to about 0.965 g/cm$^3$ and a linear polymer fraction, as determined using temperature rising elution fractionation (TREF).

15. The stretch film of claim 14 wherein (A) has a melt index from about 0.001 g/10 minutes to about 1 g/10 minutes.

16. The stretch film of claim 14 wherein (A) has a melt index from about 0.001 g/10 minutes to about 0.5 g/10 minutes.

17. A stretch film having an ultimate stretch of at least 200%, a Dart A of at least 430 gms/mil and a CF of 5% or less, and comprising at least three layers, wherein a non-skin layer comprises a propylene polymer comprising at least 50% by weight of units derived from propylene, and at least one other layer comprises an ethylene polymer composition, wherein the composition comprises:

(A) an interpolymer having a narrow molecular weight distribution and a narrow composition distribution breadth index (CDBI), defined as the weight percent of the polymer molecules having a comonomer content within 50 percent of the median total molar comonomer content, which is greater than about 50 percent and a degree of branching less than or equal to 2 methyls/1000 carbons of about 15 percent (by weight) or less and having an aluminum residue content of less than or equal to about 250 ppm present in the interpolymer composition, said interpolymer A being present in an amount of from about 15 to about 85% by weight based on the combined weight of Components A and B; and (B) an interpolymer having a broad molecular weight distribution and a broad composition distribution and a degree of branching less than or equal to 2 methyls/1000 carbons of about 10 percent (by weight) or more and a degree of branching greater than or equal to 25 methyls/1000 carbons of from about 25 percent (by weight) or less present in the interpolymer composition, said interpolymer B being present in an amount of from about 15 to about 85% by weight based on the combined weight of Components A and B.

18. The film of any of claims 13-17, wherein the ethylene polymer composition comprises a skin layer.

* * * * *